United States Patent
Song et al.

(10) Patent No.: US 6,918,610 B2
(45) Date of Patent: Jul. 19, 2005

(54) MEMBRANE HORN SWITCH STRUCTURE OF AIRBAG MODULE

(75) Inventors: Tae-ho Song, Yongin-shi (KR); Byung-ryong Cho, Suwon-shi (KR); Jin-chul Hwang, Suwon-shi (KR); Seo-hong Kim, Suwon-shi (KR); Jung-bae Ahn, Youngin-shi (KR); Ju-hyung Seo, Suwon-shi (KR)

(73) Assignee: Hyundai Mobis Co., Ltd., Seoul (KR)

( * ) Notice: Subject to any disclaimer, the term of this patent is extended or adjusted under 35 U.S.C. 154(b) by 157 days.

(21) Appl. No.: 10/336,817

(22) Filed: Jan. 6, 2003

(65) Prior Publication Data

US 2004/0036260 A1 Feb. 26, 2004

(30) Foreign Application Priority Data

Aug. 21, 2002 (KR) ................................ 10-2002-0049374

(51) Int. Cl.[7] ............................ B60R 21/16; H01H 9/00
(52) U.S. Cl. .................................. 280/728.2; 200/61.54
(58) Field of Search ............................ 280/728.2, 731, 280/61.54

(56) References Cited

U.S. PATENT DOCUMENTS

| | | | | |
|---|---|---|---|---|
| 4,934,735 A | * | 6/1990 | Embach | ........................ 280/731 |
| 5,371,333 A | * | 12/1994 | Kanai et al. | ............... 200/61.54 |
| 5,399,819 A | * | 3/1995 | Lang et al. | ................ 200/61.54 |
| 5,575,498 A | | 11/1996 | Elqadah et al. | |
| 5,723,834 A | * | 3/1998 | Hambleton et al. | ....... 200/61.54 |
| 5,855,392 A | * | 1/1999 | Simpson et al. | ............. 280/731 |
| 5,904,366 A | * | 5/1999 | Nishijima et al. | ......... 280/728.2 |
| 5,979,933 A | | 11/1999 | Murar et al. | |
| 6,283,501 B1 | * | 9/2001 | Nagata et al. | ............... 280/731 |
| 6,320,147 B1 | * | 11/2001 | Simpson | ...................... 200/512 |

* cited by examiner

*Primary Examiner*—Paul N. Dickson
*Assistant Examiner*—Laura B. Rosenberg
(74) *Attorney, Agent, or Firm*—Greenblum & Bernstein, P.L.C.

(57) ABSTRACT

A membrane horn switch structure of an airbag module does not include a back plate, which simplifies an inner configuration of a bag cover and ensures stable operation. The structure includes an outer support plate installed on a plurality of protrusions formed at an inner bottom of the bag cover, the outer support plate including a pair of films having edges which are sealed to form an inner space. A membrane horn switch unit includes a pair of inner support plates having an arc shape, which are installed in the outer support plate. The inner support plates are overlapped and spaced apart from each other. One end of each inner support plate is fixed to the outer support plates, and the other end of each inner support plate is free, so that the inner support plates are in contact with each other when the outer support plate is pressed.

3 Claims, 3 Drawing Sheets

MEMBRANE HORN SWITCH STRUCTURE OF AIRBAG MODULE

BACKGROUND OF THE INVENTION

1. Field of the Invention

The present invention relates to a membrane horn switch structure of an airbag module, and more particularly, to a membrane horn switch structure of an airbag module adhered to the inner bottom of a bag cover for an automobile, and supported by an airbag so as to compress a pair of film-type inner support plates so that they face each other.

2. Description of the Related Art

Generally, a horn switch of an automobile is positioned in front of a bag cover so that a driver may easily cope in case of an emergency.

In addition, an airbag module is also positioned in the bag cover in order to prevent secondary impact of a driver when a car crashes by protecting a driver from a frontal impact.

Thus, since the horn switch and the airbag module are positioned together within the bag cover, positions of the horn switch and the airbag module should be suitably selected for more effective functioning.

As shown in FIG. 1, a membrane horn switch 12 and a back plate 16 are mounted inside a bag cover 10.

The membrane horn switch 12 is installed at the center of the inner bag cover 10.

Also, the back plate 16 is fixed at a lower portion of the membrane horn switch 12.

Thus, when a driver presses a center portion of the bag cover 10, this force is exerted to the membrane horn switch 12.

This back plate 16 fixes the membrane horn switch 12 not to be moved downward when the membrane horn switch 12 is pressed.

At this time, the membrane horn switch 12 is coated with a copper plate 14 in a thin film shape to transmit an electric signal.

In addition, the membrane horn switch 12 is spaced a predetermined distance from the lower inner surface of the bag cover 10, and there is formed a protrusion 18 of a certain height at the lower surface of the bag cover 10 in order to stably press the membrane horn switch 12.

However, since the back plate is installed inside the bag cover, the conventional structure is complex and requires additional time to assemble.

In addition, in order to form the protrusion at the lower surface of the bag cover, manufacturing costs of the bag cover increase.

Moreover, the area used for pressing the membrane horn switch on an upper surface of the bag cover is too small.

SUMMARY OF THE INVENTION

The present invention is designed to overcome the problems of the prior art, and an objective of the invention is to provide a membrane horn switch of an airbag module which ensures easy assembly without using a back plate, and an increase in the area used for pressing the membrane horn switch by pressing a pair of inner support plates in a thin film shape, spaced apart from each other, in a membrane horn switch unit mounted between the bag cover and an airbag and then making the inner support plates to be in contact contacted with each other.

In one aspect of the present invention, there is provided a membrane horn switch structure of an airbag module in which an airbag is provided within a bag cover, which includes: an outer support plate installed on a plurality of protrusions formed at an inner bottom of the bag cover, the outer support plate made of a pair of films of which the edges are sealed to form an inner space; and a membrane horn switch unit having a pair of inner support plates in an arc shape installed in the outer support plate, the inner support plates being overlapped and spaced apart each other, wherein one end of each inner support plate is fixed to the outer support plates and the other end of each inner support plate is free so that the inner support plates contact each other when the outer support plate is pressed.

BRIEF DESCRIPTION OF THE DRAWINGS

Other objects and aspects of the present invention will become apparent from the following description of embodiments with reference to the accompanying drawing in which.

DESCRIPTION OF THE PREFERRED EMBODIMENT

Figure 1:
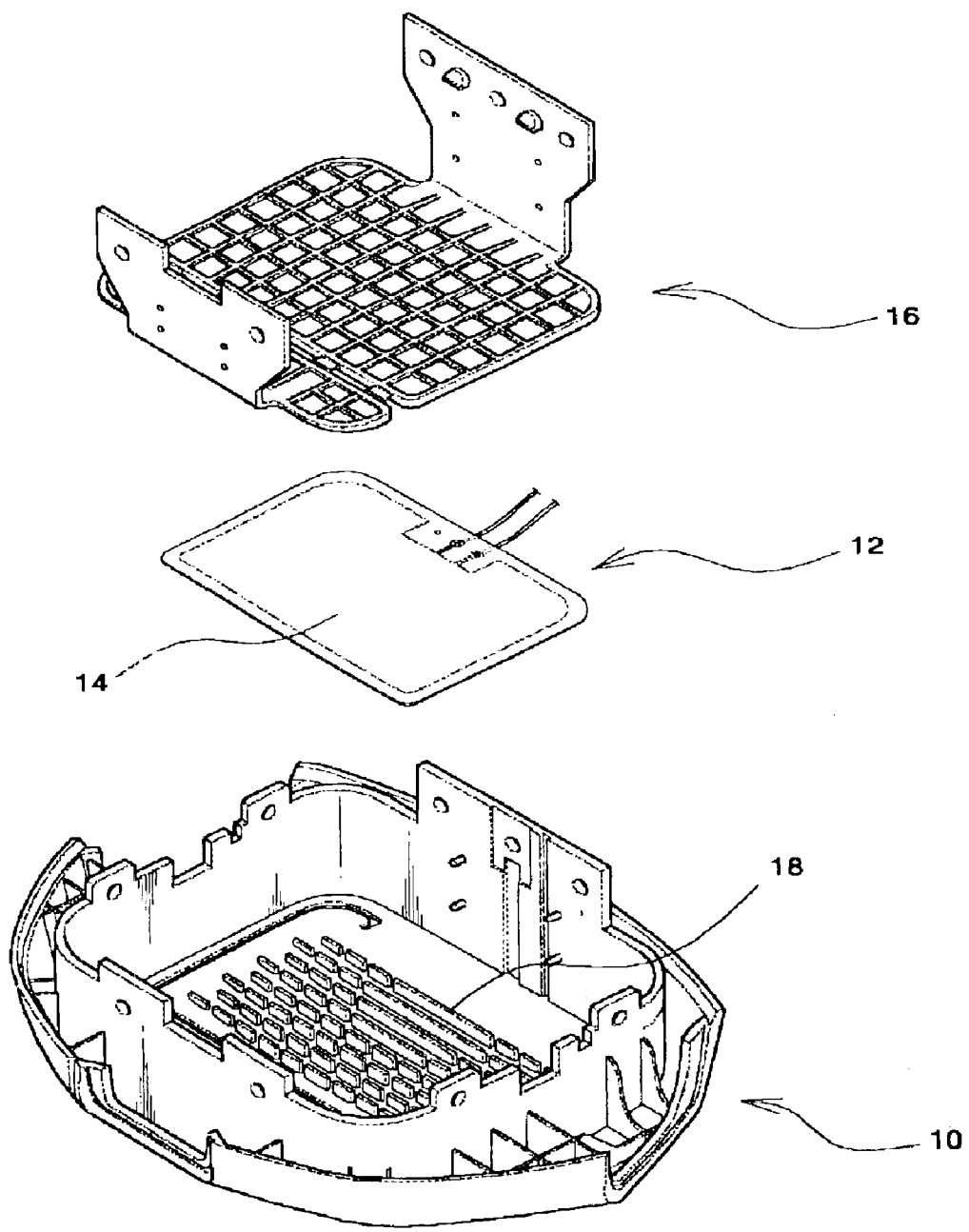
FIG. 1 is a perspective view showing a conventional membrane horn switch mounted in an airbag module.

Hereinafter, the present invention will be described in more detail referring to the drawings.

Figure 2:
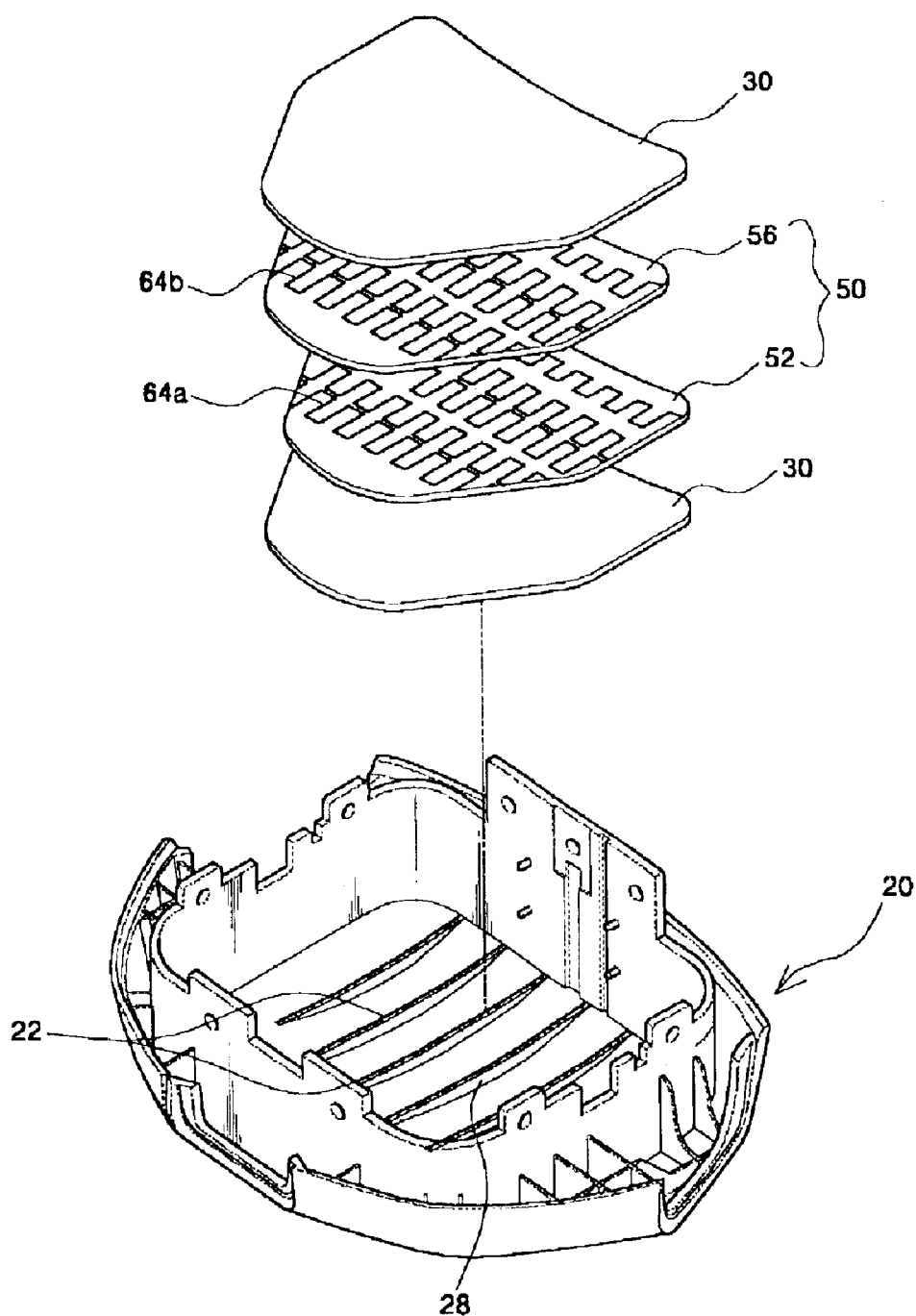
FIG. 2 is a perspective view showing a membrane horn switch mounted in an airbag module according to the present invention.
Figure 3:
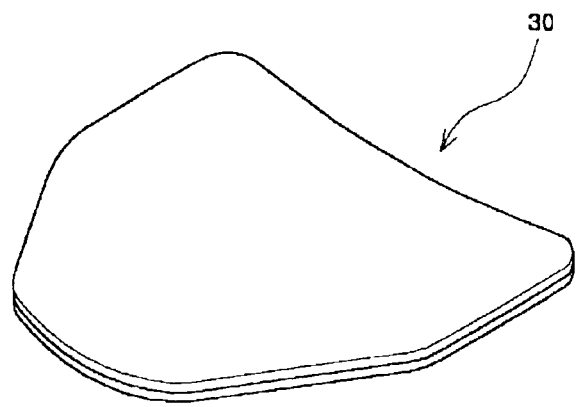
FIG. 3 is a perspective view showing an appearance of a membrane horn switch unit according to the present invention.
Figure 4:
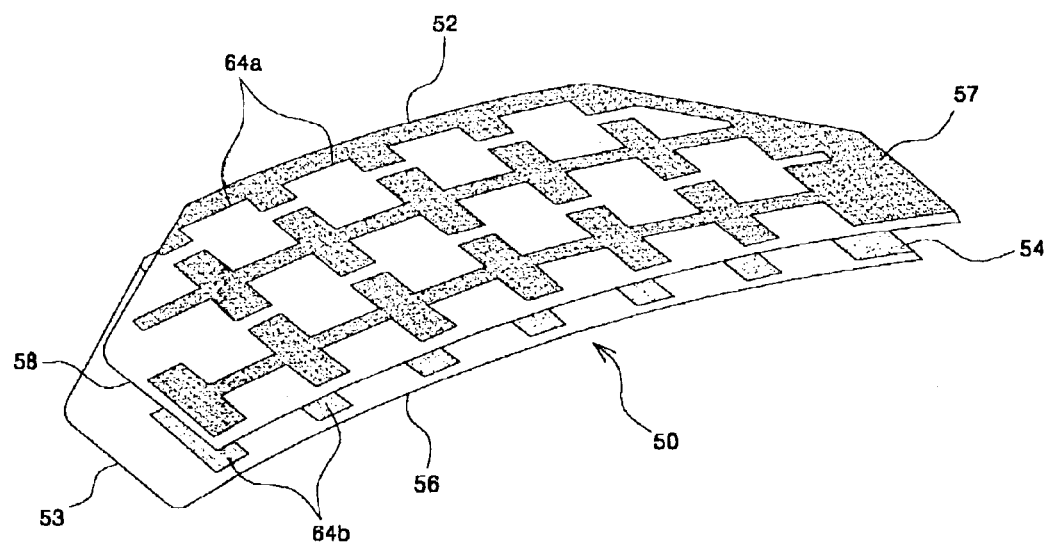
FIG. 4 is a perspective view showing an inner configuration of the membrane horn switch unit according to the present invention.

FIG. 2 is a perspective view showing a membrane horn switch installed to an airbag module according to the present invention, FIG. 3 is a perspective view showing an appearance of a membrane horn switch unit according to the present invention, and FIG. 4 is a perspective view showing an inner configuration of the membrane horn switch unit according to the present invention.

A part same as or similar to the conventional art is endowed with the same or similar name, and not described in detail.

As shown in FIGS. 2 to 4, the membrane horn switch structure of an airbag module according to the present invention is configured that, in an airbag module in which an airbag is provided within a bag cover 20, the structure includes an outer support plate 30 installed on a plurality of protrusions formed at an inner bottom of the bag cover 20 and made of a pair of films of which edges are sealed to form an inner space, and a membrane horn switch unit having a pair of inner support plates, overlapped and spaced apart, in an arc shape installed in the outer support plate 30 wherein one end of each inner support plate is a fixed end 53 and 57 and the other end of each inner support plate is a free end 54 and 58 so that the inner support plates come into contact with each other when the outer support plate 30 is pressed.

As shown in FIG. 2, the airbag module includes a bag cover 20, an outer support plate 30, a membrane horn switch unit and an airbag (not shown).

A center of an upper surface of the bag cover 20 is made of a rubber material having elasticity which can be easily pressed by a driver and easily restored to its original state.

A plurality of protrusions 28 are formed at an inner surface of the bag cover 20.

The plurality of the protrusions 28 are arranged in a longitudinal direction and have the same curvature as the outer support plate 30, when viewed from the side.

In addition, the outer support plate 30 including the membrane horn switch unit is mounted inside the bag cover 20.

At this time, the outer support plate 30 is made of a pair of films of which the edges are sealed. Also, the outer support plate 30 has an upwardly convex arc shape and forms a predetermined inner space.

In addition, an upper surface of the outer support plate 30 is adhered to an adhesive 22 coated on a lower surface of the bag cover 20, and the adhesive 22 is preferably coated on an upper surface of the protrusions 28.

Also, a lower surface of the outer support plate 30 is supported by the airbag (not shown), and this airbag ensures the outer support plate 30 does not descend even though it is pressed.

On the other hand, the membrane horn switch unit has a pair of films which are provided inside the outer support plate 30 of which edges are sealed, as shown in FIGS. 3 and 4.

In other words, the membrane horn switch unit includes a pair of inner support plates 50, which are overlapped, and copper plates 64a and 64b formed on each inner support plate 50. When surfaces of the copper plates 64a and 64b contact each other, it is recognized that a driver presses the bag cover.

A first inner support plate 52, which is one of the inner support plates 50, has a first fixed end 53 which is interposed and fixed between the films of the outer plate 30 before the outer plate 30 is sealed. The first inner support plate 52 has an upwardly-convex arc shape.

In addition, a first free end 54, which is the other end of the first inner support plate 52, does not contact the inner edge of the outer support plate 30 so as to be freely movable regardless of pressure.

A second inner support plate 56, which is the other one of the inner support plates 50, has a second fixed end 57 that is interposed and fixed between the films of the outer support plate 30 at a position of the inner edge opposite to the first fixed end 53.

In addition, a second free end 58, which is the other end of the second inner support plate 56, is not contacted with the inner edge of the outer support plate 30, similar to the first free end 54, so as to be freely movable regardless of pressure.

The first inner support plate 52 is positioned above the second inner support plate 56, and the first inner support plate 52 and the second inner support plate 56 are spaced apart and have arcs of the same curvature.

A distance between the first inner support plate 52 and the second inner support plate 56 is set to 0.5 mm in this embodiment, but it can be set differently depending on various conditions.

Also, considering the fact that the first inner support plate 52 and the second inner support plate 56 have arc shapes, the outer support 30 also has an arc shape.

In addition, the bag cover 20 also has an upwardly-convex arc shape in order to better restore to its original state when the pressure caused by elasticity is released.

If the first and second inner support plates 52 and 56 are parallel to each other, the first and second inner support plates 52 and 56 may be not stably contacted each other when the pressure is exerted to the bag cover 20 and the outer support plate 30. It is the reason that the first and second inner support plates 52 and 56 have arc shapes.

In addition, if the first and second inner support plates 52 and 56 are parallel to each other, the copper plates 64a and 64b formed on the first and second inner support plates 52 and 56, or marks, should be identical and they can be contacted only with a slight shock, thereby generating a horn. Thus, the first and second inner support plates 52 and 56 have arc shapes so that the marks are not identical.

The copper plates 64a and 64b are marks having predetermined shapes on a surface of each of the first and second inner support plates 52 and 56.

The marks, or the copper plates 64a and 64b, are designed to recognize that the surfaces of the first and second inner support plates 52 and 56 are contacted.

If the first and second inner support plates 52 and 56, spaced apart, are pressed, as the first and second free ends 54 and 58 are moved a predetermined distance in opposite directions, the surfaces of the first and second inner support plates 52 and 56 are contacted, so that the copper plates become coincident.

On the other hand, the length of the first and second inner support plates 52 and 56 should be adjusted so that the first and second free ends 54 and 58 moving in a straight direction do not come in contact with the inner edge of the outer support plate 30.

Now, operation of the membrane horn switch structure of an airbag module according to the present invention is described in detail.

If a driver presses an upper surface of the bag cover 20, the pressure is transmitted to the upper surface of the outer support plate 30 adhered to the lower surface of the bag cover 20.

At this time, the outer support plate 30 is not moved beyond a predetermined point since the outer support plate 30 is supported by the airbag.

Due to the pressure exerted to the outer support plate 30, the outer support plate 30 presses the first inner support plate 52 mounted therein.

As the first inner support plate 52 is pressed, the first free end 54 is forced outward in one direction and the surface of the first inner support plate 52 is in contact with the surface of the second inner support plate 56.

At this time, the second free end 58 of the second inner support plate 56 is also forced out in the opposite direction.

In addition, the marks on the copper plates 64a and 64b formed in the first and second inner support plates 52 and 56 coincide completely, so the automobile blows a horn through a general mechanism.

Also, the marks on the copper plates 64a and 64b have latticed patterns in the present invention, and particularly it is preferable that the horn is blown when vertical lattice patterns coincide.

Also, it is possible that the marks are designed to have a certain range of an allowable error so that the horn can be blown although the marks do not coincide completely.

APPLICABILITY TO THE INDUSTRY

As described above, the membrane horn switch structure of an airbag module according to the present invention does not use a conventional back plate, so ensuring easy manufacturing and assembling and improving work efficiency during assembling.

In addition, an area used for pressing the bag cover to generate a horn is broader than that of the conventional bag cover, so the membrane horn switch can be operated more stably.

What is claimed is:

1. A membrane horn switch structure of an airbag module in which an airbag is provided within a bag cover, the structure comprising:

an outer support plate installed on a plurality of protrusions formed at an inner bottom of the bag cover, the outer support plate including a pair of films having edges which are sealed to form an inner space; and a membrane horn switch unit having first and second arc-shaped inner support plates installed in the inner space between the films of the outer support plate, the first and second inner support plates being overlapped and spaced apart from each other, wherein a first end of the first inner support plate is fixed to the outer support plate, and a first end of the second inner support plate is fixed to the outer support plate, the first ends of the first and second inner support plates being opposite ends which are fixed to opposite ends of the outer support plate, and the first and second inner support plates each having second ends which are free in order to be laterally movable relative to each other so that the inner support plates contact each other when the outer support plate is pressed.

2. A membrane horn switch structure of an airbag module according to claim 1, wherein the outer support plate has an upwardly-convex arc shape, an upper film of the outer support plate being adhered to an adhesive coated on the protrusions of the bag cover, and a lower film of the outer support plate being supported by the airbag.

3. A membrane horn switch structure of an airbag module according to claim 1, wherein the membrane horn switch includes:

the first ends of the inner support plates are interposed between faced edges of the films of the outer support plate and the second ends of the inner support plates are not contacted with an inner edge of the outer support plate; and copper plates of a predetermined shape formed on a surface of each inner support plate so that the shapes of the copper plates coincide when the surfaces of the inner support plates are in contact with each other.

* * * * *